H. COOK.
MOTOR VEHICLE TRACTION APPARATUS.
APPLICATION FILED APR. 19, 1918.
1,358,934.
Patented Nov. 16, 1920.
2 SHEETS—SHEET 1.
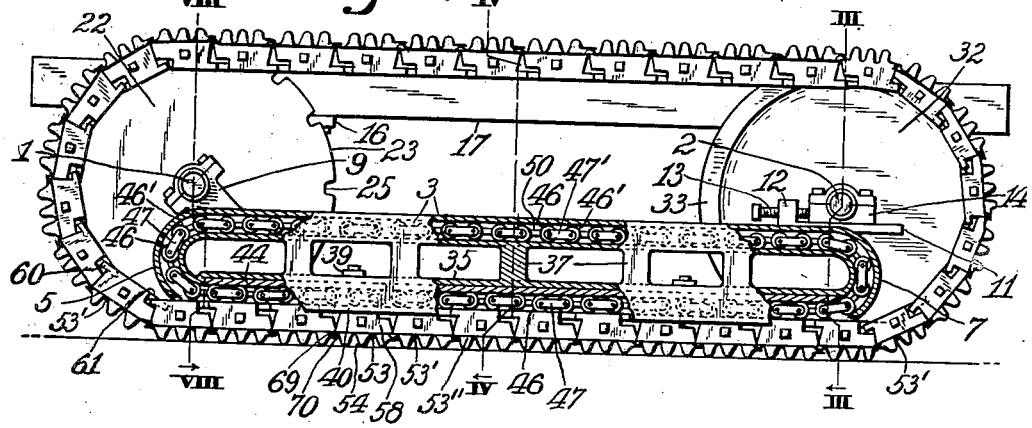
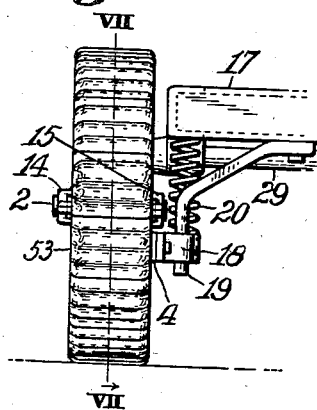
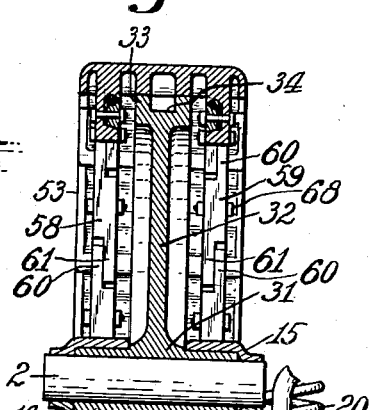
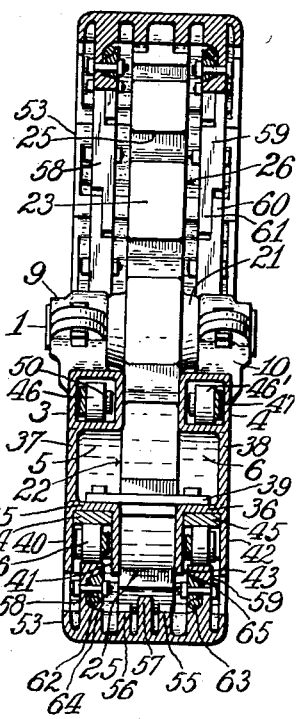
WITNESS:
J. H. Gardner
F. M. Roeder
INVENTOR:
Hugo Cook,
BY
E. D. Silvius,
ATTORNEY.

H. COOK.
MOTOR VEHICLE TRACTION APPARATUS.
APPLICATION FILED APR. 19, 1918.
1,358,934.
Patented Nov. 16, 1920.
2 SHEETS—SHEET 2.
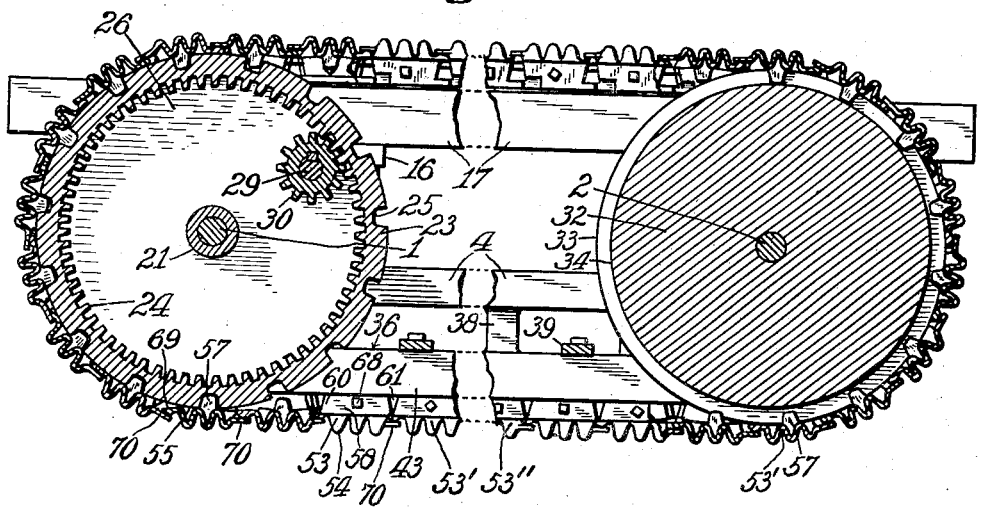
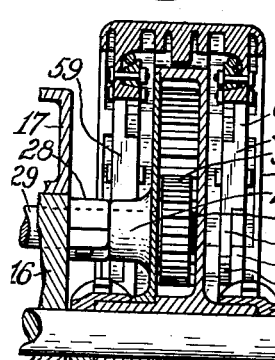
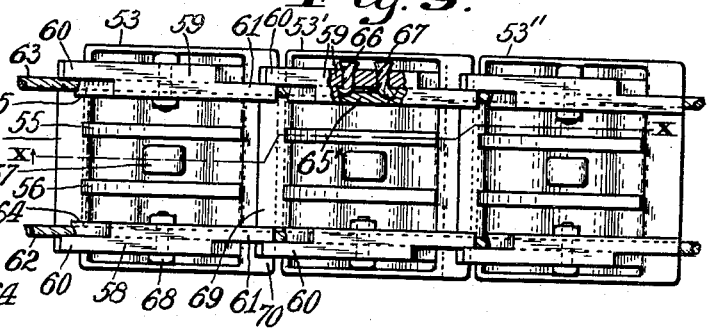
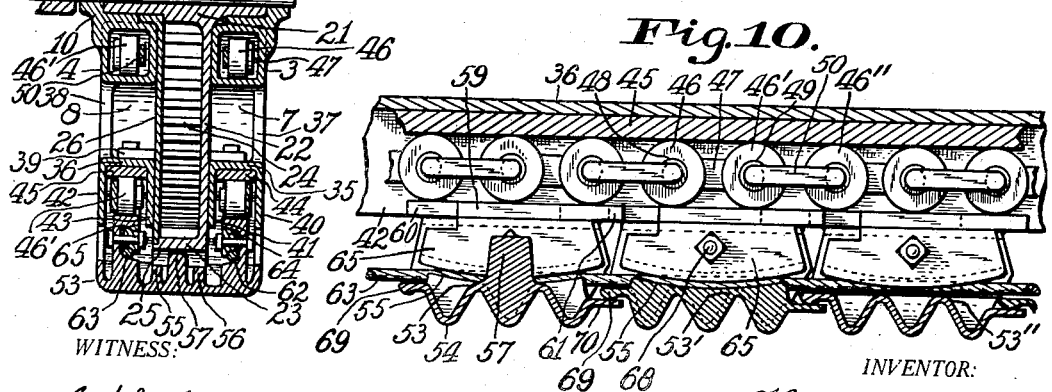
WITNESS:
J. H. Gardner
F. M. Roeder
INVENTOR:
Hugo Cook,
BY
E. T. Silvius,
ATTORNEY.

UNITED STATES PATENT OFFICE.

HUGO COOK, OF PERRY TOWNSHIP, MARION COUNTY, INDIANA.

MOTOR-VEHICLE TRACTION APPARATUS.

1,358,934.  Specification of Letters Patent.  Patented Nov. 16, 1920.

Application filed April 19, 1918. Serial No. 229,533.

*To all whom it may concern:*

Be it known that I, HUGO COOK, a citizen of the United States, residing in Perry township, in the county of Marion and State of Indiana, have invented a new and useful Motor-Vehicle Traction Apparatus, of which the following is a specification, reference being had to the accompanying drawings and to the letters and figures marked thereon.

This invention relates to apparatus whereby the tractive force of a driving wheel of a motor vehicle is augmented, the invention having reference more particularly to apparatus whereby a motor vehicle is enabled to exert its driving force on the ground without slippage and wastage of energy.

An object of the invention is to provide motor-vehicle traction apparatus which shall be so constructed as to be compact and strong and also adapted to exclude road dust and mud from the internal or operating parts thereof, to the end that durability may be obtained.

Another object is to provide an improved traction-increasing apparatus for motor-vehicles which shall be so constructed as to afford very large or extensive contact with the ground for obtaining the maximum tractive force, more especially on soft or uneven ground.

A further object is to provide improved anti-friction bearings for traction apparatus of the above-mentioned character, of such construction as to permit the traction-increasing devices to directly carry the maximum amount of weight of the motor-vehicle, so as to promote uniform action or operation of the traction apparatus.

A still further and more specific object is to provide an improved track of the relaying type for motor-vehicles which are required to exert great tractive force, which track shall be so constructed as to be simple and inexpensive and yet be durable and economical in use.

With the above-mentioned and other objects in view, the invention consists in a novel sectional and practically continuous track for motor-vehicles, including novel anti-friction bearings and a novel arrangement thereof to support the motor-vehicle on the track; and, the invention consists also further in the parts, and combinations and arrangements of parts or elements, as hereinafter particularly described and further defined in the accompanying claims.

Referring to the drawings,—Figure 1 is a side elevation of a portion of the main frame of a motor-vehicle to which the improved traction apparatus is applied, portions being broken away to disclose internal parts; Fig. 2 is a fragmentary end view of Fig. 1; Fig. 3 is a section enlarged approximately on the line III—III in Fig. 1; Fig. 4 is a section enlarged approximately on the line IV—IV in Fig. 1; Fig. 5 is a fragmentary enlarged longitudinal section of the chain of roller bearings employed; Fig. 6 is a longitudinal section of one of the links of the chain of bearings; Fig. 7 is a section approximately on the line VII—VII in Fig. 2 on an enlarged scale; Fig. 8 is a section enlarged approximately on the line VIII—VIII in Fig. 1; Fig. 9 is a plan view on an enlarged scale showing connected sections of the improved track; and, Fig. 10 is a section approximately on the line X—X in Fig. 9.

Similar reference characters on the various figures of the drawings indicate corresponding elements or features of construction herein referred to.

For the purpose of illustrating the invention two wheels of a motor-vehicle are shown and obviously may be duplicated to any desirable extent, and in some cases two wheels for traction purposes may be sufficient. A truck comprises two axles 1 and 2 spaced a suitable distance apart and connected together by means of two hollow bearing guides 3 and 4 horizontally arranged and adapted to perform the functions of truck frame members. One end of the guide 3 has a curved portion 5, the guide 4 having a curved portion 6 thereon. The opposite end of the guide 3 has a curved portion 7, the end of the guide 4 having a curved portion 8 thereon. The guides 3 and 4 adjacent to the curved portions 5 and 6 are provided with boxes 9 and 10 respectively that are connected with the axle 1, being preferably adapted to be pivoted to the axle, being suitably spaced apart as are the guides 3 and 4. The guides 3 and 4 have each a horizontal guide bar 11 thereon near the opposite end of the guide, and also an abutment 12 which has a set-screw 13 therein. Axle boxes 14 and 15 are adjustably arranged on the guide bars and in contact with the set-screws and are connected to the axle 2, preferably so as to be rigidly secured to the axle. Preferably the inner sides of the axle boxes are recessed to receive portions of the wheel hubs and exclude dust. A box or standard member 16 is suitably connected with the axle 1 to be carried thereby and is secured to the main frame 17, so that the frame may be pivotally supported. One of the guides, 4, has a bracket guide 18 thereon, and a guide 19 which is secured to the main frame 17 is vertically guided in the bracket guide, the frame being supported upon a spring 20 which is supported upon the bracket guide.

A driving wheel is provided which assists in carrying the motor-vehicle and comprises a hub 21 suitably arranged on the axle 1 and preferably having its end portions extending into the recesses of the axle boxes 9 and 10, the hub having a web 22 thereon to which is connected a rim 23, the inner side of the rim having gear teeth 24 thereon. The exterior of the rim has a suitable number of notches or recesses 25 therein to receive sprocket teeth. The web 22 is on one side of the rim, and a guard plate or disk 26 is arranged at the opposite side of the rim and so as to extend about the hub of the wheel, one portion of the outside of the plate having a journal bearing 27 thereon. The standard 16 is provided with a journal bearing 28 which supports a driving shaft 29 that extends through the bearing 27 and has a pinion 30 secured thereto which is arranged in connection with the gear teeth 24. The driving shaft may be rotated by any suitable or desired means, as will be understood. In case two driving wheels are not desired, a carrying wheel is provided which comprises a hub 31 suitably arranged on the axle 2, a web 32 on the hub and a rim 33 on the web, the end portions of the hub preferably extending into the recessed axle boxes 14 and 15. The exterior of the rim 33 has a circumferentially-extending groove 34 therein to receive sprocket teeth.

A bearing bar 35 is horizontally arranged and connected to the curved portions 5 and 7 of the guide 3 so as to be below the guide, and similarly a bearing bar 36 is connected to the curved portions 6 and 8. Braces 37 are connected to the guide 3 and the bearing bar 35, similar braces 38 being connected to the guide 4 and the bearing bar 36. Tie bars 39 are connected to the bearing bars 35 and 36. The bearing bar 35 has downward-extending guide plates or sides 40 and 41 suitably spaced apart, the bearing bar 36 having similar plates or sides 42 and 43 which extend to side portions of the curved portions of the hollow guides. The bearing bar 35 preferably has a separate true face plate 44 on its under side, the bearing bar 36 having a similar face plate 45 on its under side, the face plates preferably being composed of machined steel bars.

Two trains of anti-friction bearings are provided, each preferably comprising a suitable number of rollers 46, 46', 46'', connected together by means of main link bars 47, 47', having hollow pivots 48 and 49 on which two rollers are respectively guided, and link bars 50 having pivots 51 and 52 thereon that extend into a hollow pivot of two adjacent link bars 47. One train of bearings is arranged in the hollow guide 3 and so as to extend around under the face plate 44, the companion train of bearings being arranged in the hollow guide 4 and so as to extend around to the under side of the face plate 45, so that the face plates and thereby the bearing bars 35 and 36 are supported throughout their length upon the bearing rollers.

The improved sectional track comprises a suitable number of sections 53, 53', 53'', adapted to constitute shoes for directly supporting the motor-vehicle on the ground, the under or face portion of each section having projections or transverse ribs 54 to prevent the sections from slipping on the ground. Each section has two curved bearing portions 55 and 56 on its back to directly support the rim portion of the carrying wheels, and the section has also a sprocket tooth 57 on the middle of its back to be received into the recesses 25 of the driving wheel. The back of each section or shoe has also a pair of rail sections or members 58 and 59 that directly support the bearing rollers 46, 46' of the two trains respectively, each rail section having a projection 60 on the outside of one end thereof and a projection 61 on the inside of the opposite end thereof, so that the rails of each two adjacent sections shall overlap and be practically continuous. The sections or shoes are connected together by means of cables 62 and 63 which are arranged against the rail sections and secured thereto by means of segments or grooved clamps 64 and 65 respectively. The segments are adapted to form curved guides for the cable about the axles. Each cable is made practically continuous by placing its two ends 66 and 67 in suitable holes in one of the rail sections 59 and securing them in place by a suitably modified clamp 65', as seen in Fig. 9. Each clamp may be secured to the rail section by a bolt 68. The sectional track is arranged so as to extend about the two wheels of the truck collectively, so that the track may be taken up from the ground by the rearward one of the wheels in operation and re-laid by the forward one of the wheels. The curved guides for the cables may be variously formed. One end of each section or shoe has a joint lip 69 and the opposite end has another lip 70 adapted to have engagement with the lip 69 of the adjacent section to exclude road dirt from the working parts at the back of the section or shoe.

In practical use the rotation of the pinion 30 causes the driving wheel to be powerfully rotated. The force of the driving wheel is applied to the ground throughout the length of that portion of the sectional track that supports the bearing rollers, being co-extensive with the distance between the two carrying wheels of the truck, so that all the higher portions of uneven ground within such distance are engaged by different portions of the sectional truck which is prevented from yielding or being pushed upward, since the bearing bars prevent such action. Since provision is made for excluding road dirt from the moving or operative parts, durability of the traction apparatus in operation is assured, none of the working parts being liable to suffer because of lack of lubrication.

Having thus described the invention, what is claimed as new is—

1. A traction apparatus including two wheels, the periphery of one of the wheels having notches, a main frame mounted on the wheels, a plurality of track sections collocated to extend about the wheels collectively, each track section having two bearing portions on its back to be moved under and support the peripheries of the wheels and having also a tooth between the bearing portions to enter the notches, and a pair of continuous wire cables extending about the axis of the two wheels and secured to all the track sections.

2. A traction apparatus including two wheels, each wheel having an axle, a main frame mounted on the wheel axles, a plurality of track sections collocated and extending about the wheels collectively, each track section having a pair of rail sections and also a bearing portion on the back thereof, the bearing portions supporting the wheels, two straight bearing bars having supporting connection with the wheel axles, a continuous cable extending about the axles collectively and secured to all the track sections, and two trains of bearing rollers to roll on the rail sections respectively under and in supporting contact with the bearing bars respectively.

3. A traction apparatus including two wheels, each wheel having an axle, a main frame mounted on the wheel axles, a plurality of collocated track sections extending about the wheels collectively, the track sections being adapted to support the wheels and each having a rail section on the back thereof, each rail section extending beyond the ends of the track section, a straight bearing bar having supporting connection with the wheel axles, a continuous cable extending about the wheel axles collectively, grooved segments secured to the rail sections respectively and securing the cable to the sections, each segment having a curved guide portion to guide the cable about the axles at a distance therefrom, and a train of bearing rollers arranged to operate between the bearing bar and the rail sections.

4. In traction apparatus, a sectional track comprising a plurality of track sections having each a pair of rail sections on the back thereof, two cables extending alongside of the rail sections respectively of the track sections and secured thereto, two trains of bearing rollers to roll on the rail sections of the track sections, and two bearing bars supported upon the rollers of the two trains respectively, in combination with two wheels to be supported on the backs of the track sections, and means for preventing one of the wheels from slipping on the track sections.

5. In traction apparatus, the combination of two axles, two wheels on the axles respectively, a hollow guide connected for stability with the two axles and having downward-extending curved end portions, a straight bearing bar connected to said end portions and having a face plate on the under side thereof, a sectional track extending below said face plate and also about the wheels collectively, and a train of bearing rollers extending through the hollow guide and its end portions and also between the sectional track and said face plate.

6. In traction apparatus, the combination of a plurality of track sections having each a rail section on its back, a cable connected to the rail section of all the track sections, two wheels to roll upon the backs of the track sections, a main frame carried by the wheels, a plurality of rollers to roll upon said track sections, a plurality of main link bars at one end of the rollers to connect the rollers in a train, each link bar having two hollow pivots extending through two adjacent rollers, other link bars at the opposite end of the rollers and having two pivots thereon extending into one of the hollow pivots of two adjacent ones of the main link bars, and a bearing bar supported upon the rollers and having supporting connection with the axis of each of said two wheels.

7. In traction apparatus, the combination with two wheels, and a main frame carried by the wheels, of a plurality of track sections collocated to extend about and support the wheels collectively, each track section being provided on its back with a rail portion that is curved to correspond to the curvature of the wheel tread, each of said sections being provided also with a curved guide to coöperate with the guides of adjacent sections to guide a cable about the axes of the wheels, a cable extending through the track sections in contact with the curved guides thereof and thereby secured to the sections, and means for preventing one of the two wheels from slipping on the track sections.

In testimony whereof, I affix my signature in presence of two witnesses.

HUGO COOK.

Witnesses:
E. T. SILVIUS,
F. M. ROEDER.